July 19, 1955  R. W. BROWN  2,713,498
PNEUMATIC VEHICLE SUSPENSION
Filed Jan. 14, 1950  5 Sheets-Sheet 1

INVENTOR.
BY Roy W. Brown
ATTORNEYS

July 19, 1955 R. W. BROWN 2,713,498
PNEUMATIC VEHICLE SUSPENSION

Filed Jan. 14, 1950 5 Sheets-Sheet 3

INVENTOR.
Roy W. Brown

BY

ATTORNEYS

July 19, 1955  R. W. BROWN  2,713,498

PNEUMATIC VEHICLE SUSPENSION

Filed Jan. 14, 1950  5 Sheets-Sheet 4

INVENTOR.
Roy W. Brown
BY
Ely & Frye
ATTORNEYS

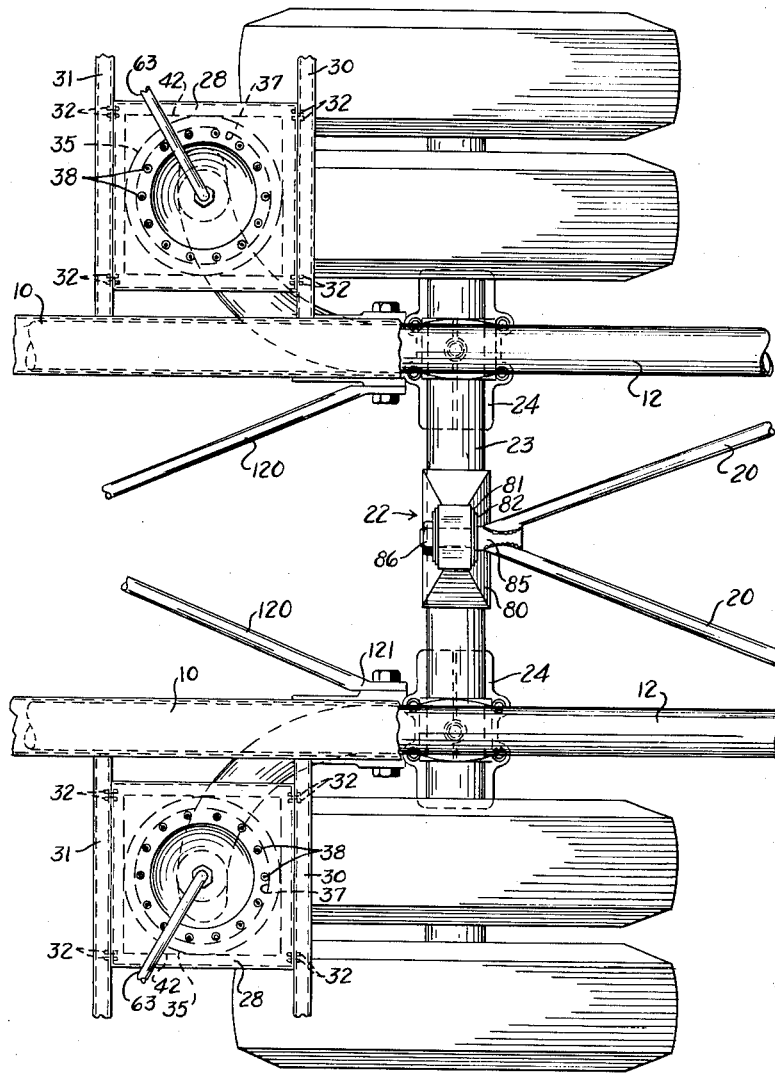

United States Patent Office 2,713,498
Patented July 19, 1955

2,713,498

PNEUMATIC VEHICLE SUSPENSION

Roy W. Brown, Akron, Ohio, assignor to The Firestone Tire & Rubber Company, Akron, Ohio, a corporation of Ohio Application January 14, 1950, Serial No. 138,618

8 Claims. (Cl. 280—104.5)

This invention relates generally to improvements in pneumatic vehicle suspensions.

A primary object of the invention resides in the provision of an improved vehicle suspension incorporating a pneumatic bellows of the type commonly termed an "air spring."

An important object relates to improvements in tandem type wheel suspension assemblies wherein an improved operative connection is provided between forward and aft wheel mounting assemblies in a manner whereby compensation of the aft assembly more effectively to meet varying road conditions is automatically effected in response to the deflection of the forward assembly resulting from a particular road condition.

Another object of the invention is to provide an improved wheel suspension in which a minimum of vertical wheel travel is utilized to provide satisfactory springing of the vehicle.

Still another object of the invention is to provide an improved pneumatic suspension system which serves the dual function of effectively cushioning a load placed upon a vehicle in which the system is incorporated while providing improved means for the transverse stabilization of said vehicle.

A further object is to provide suspension means particularly adapted for use on vehicles of tandem type to permit close positioning of fore and aft wheel assemblies to reduce skid therebetween during turns.

Another object resides in the provision of a vehicle stabilizing system wherein body roll is reduced to a minimum without an attendant reduction in riding qualities.

Still another object relates to improvements in a tandem wheel structure of the type in which vertical displacement of one set of wheels causes a change in the suspension characteristics of a second set of wheels with which the first set cooperatively associate.

Another object of the invention is generally to improve and simplify multiple wheel suspension units of the individually sprung pneumatic type for one or more of the above stated purposes. A preferred embodiment of the invention is illustrated herein for exemplification, but modifications and adaptations readily will become apparent to persons skilled in the art without departure from the spirit and scope of the invention.

In the drawings, in which like parts are identified by the same reference numerals throughout:

Fig. 7 is a section along line 7—7, Fig. 1.

Fig. 8 is a plan view of two elements of the invention mounted transversely on a vehicle frame.

Figure 1:
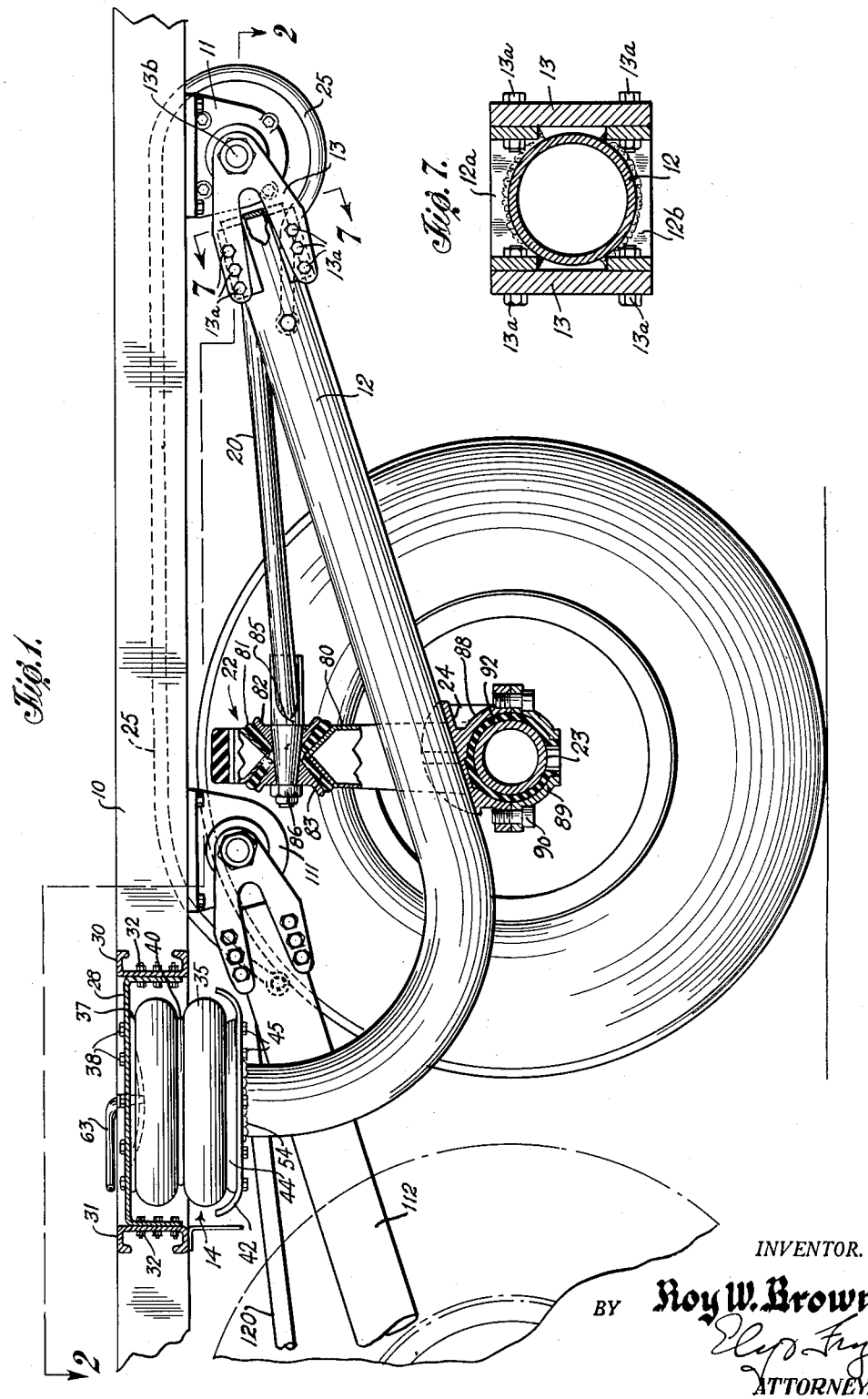
Fig. 1 is a side elevational view, partially in section, of a trailer type suspension unit having incorporated therein certain concepts of the present invention.

With reference to Fig. 1, a portion of a trailer mounting assembly is shown including a frame member 10 providing support for depending bracket 11 to which one end of a tubular strut is pivoted, the opposite end of strut 12 being in operative association, as later described, with an air spring assembly generically designated 14. As shown in section, Fig. 7, strut 12 has welded thereto a pair of brackets 12a and 12b to which a pair of identical mounting brackets 13 are clamped by bolts 13a, the brackets 13 being mounted to depending brackets 11 by pintle bolt 13b. The suspension assembly briefly described above represents the forward unit of a multiple wheel suspension which includes an identical aft unit, shown dotted in Fig. 1, and a depending bracket 111, spaced aft of bracket 11 along frame member 10 to which a tubular strut 112, identical with strut 12, is pivoted. Strut 112 leads to an air spring assembly, not shown, but corresponding to air spring assembly 14.

Figure 2:
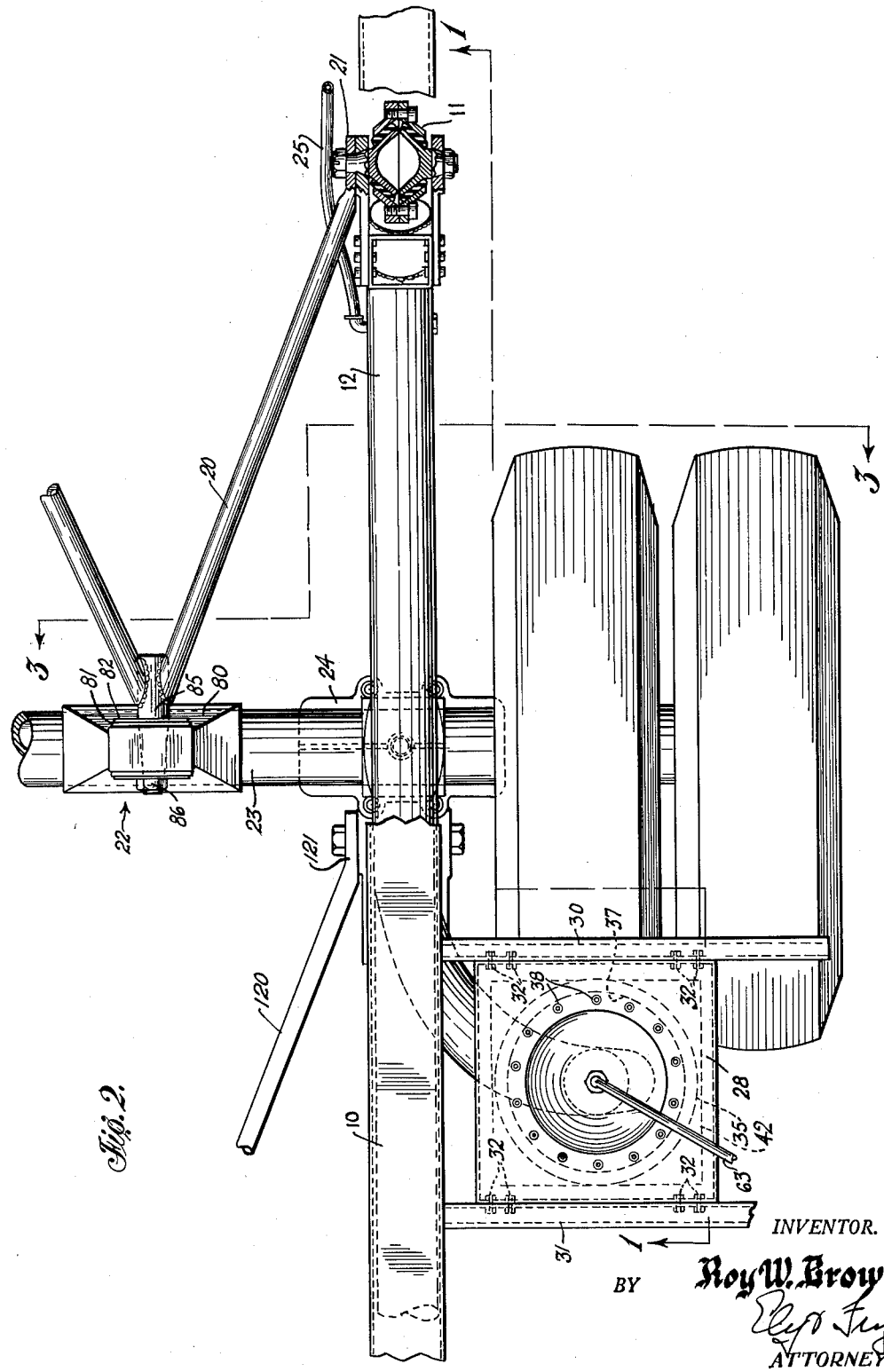
Fig. 2 is a plan view, partially in section, of the device of Fig. 1.

As best shown in Fig. 2 and Fig. 8, wish-bone type bracing structures 20 and 120 have arm portions, 21 and 121 respectively, pivotally connected to frame 10 along the axis of pivot of structure 12 and its corresponding opposite strut, with the arms converging toward and engaging a single point resilient type universal connector assembly 22 fixedly mounted on a wheel carrying axle 23. Axle 23 is suitably attached, transversely of the frame represented by member 10, to the tubular strut member 12 by bracket 24 and to an identical member, not shown, on the opposite side of the frame assembly. A pair of tubular fluid conduits 25 communicate between forward end portions of paired tubular suspension struts 12 and the forward end portions of the after positioned tubular suspension struts 112 to effect pneumatic compensation of load and deflection therebetween as later described. Only the forwardly positioned suspension assembly as shown in heavy lines is described in detail, due to the identity of the forward and aft assemblies.

Figure 3:
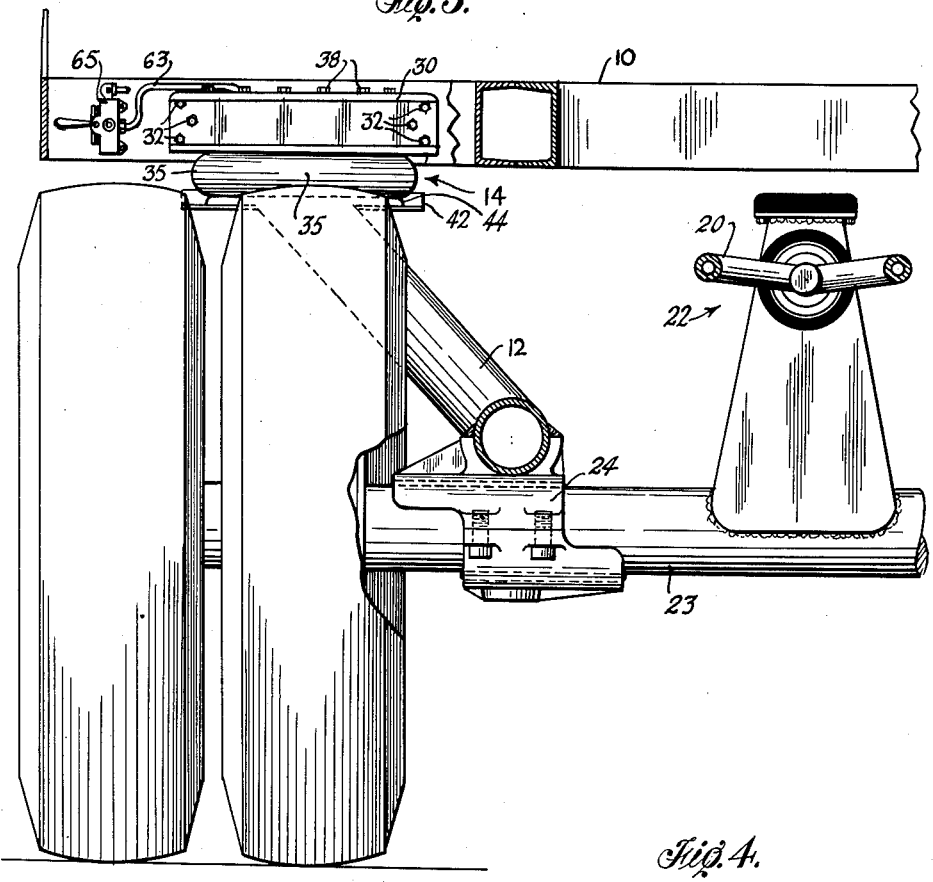
Fig. 3 is a fragmentary view, mostly in section, taken along line 3—3 of Fig. 2.

As best shown in Fig. 3, the after portion of tubular strut 12 curves upwardly and laterally to engage air spring assembly 14 in a manner to provide a fluid connection, sealed to the atmosphere, between the interior of tubular strut 12 and the interior of the air spring assembly 14. Assembly 14 includes a depending cap-like mounting housing 28 suitably secured to the vehicle frame, and positioned as shown intermediate a pair of transverse beams 30 and 31 and clamped thereto by bolts 32. A bellows-like deformable air spring element 35 has its upper annular margin clamped, in fluid sealing relation, to the inner wall surface of housing 28 by means of a clamping ring 37, Fig. 4, secured to housing 28 by suitable circumferentially spaced clamping bolts 38. Air spring element 35 may be provided with a single expansion constricting ring 40 intermediate its end margins, defining a pair of inter-connected air chambers, but it is understood that any known type of air spring assembly may be employed if desired, as for example of the type disclosed in U. S. Patents 2,133,279, 2,208,537, 2,208,540, and 2,221,470 to applicant. The lower end of air spring element 35 terminates in an upwardly dished and centrally apertured closure member 42, a suitable fluid seal being effected by means of a clamping ring 44 and bolts 45. Tubular strut 12 extends through a central aperture provided in closure member 42 to terminate interiorly of bellows 35, preferably substantially flush with the inner surface of dished closure member 42. Member 42 is provided with an upwardly dished margin to define a protective guard for the assembly.

Figure 6:
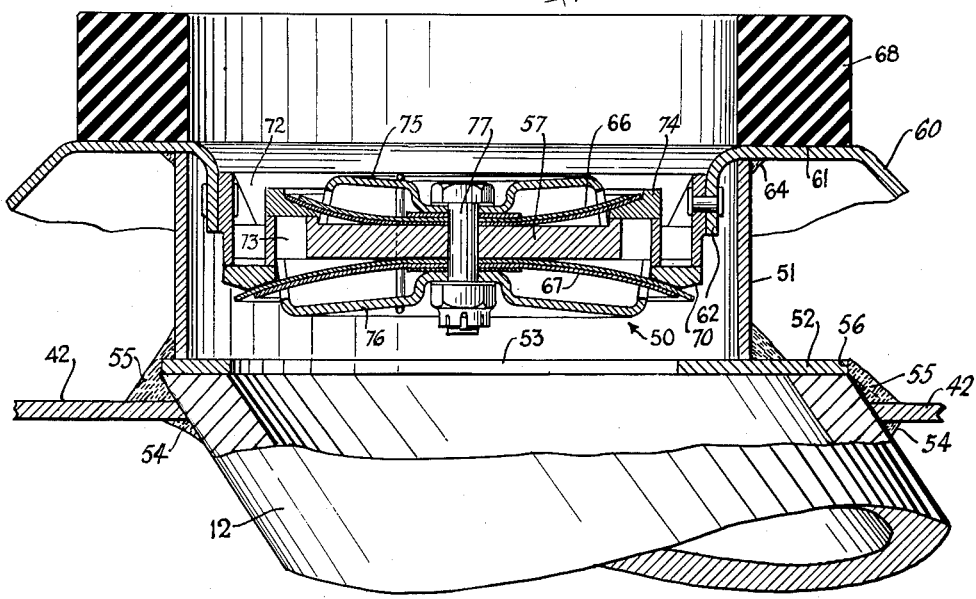
Fig. 6 is a diametric section of the valve assembly enclosed in a frusto-conical housing as shown in Fig. 4.

As shown in Fig. 6, a valve structure, generically designated 50, is disposed within a vertically positioned tubular member 51 which finds its support on a plate 52, welded to the upper end of tubular member 12 and apertured at 53 to permit fluid flow from the interior of tubular member 12, through the interior of housing 51, to the interior of bellows 35. A strong bond has been established between the lower closure member 42 of the air spring structure and tubular member 12 by welding shown at 54 and 55, extending circumferentially of member 12 as shown. Plate 52 abuts with the end surfaces of member 12, to which it is welded, as at 56, to insure fluid sealing engagement between the plate and tubular member.

Figure 4:
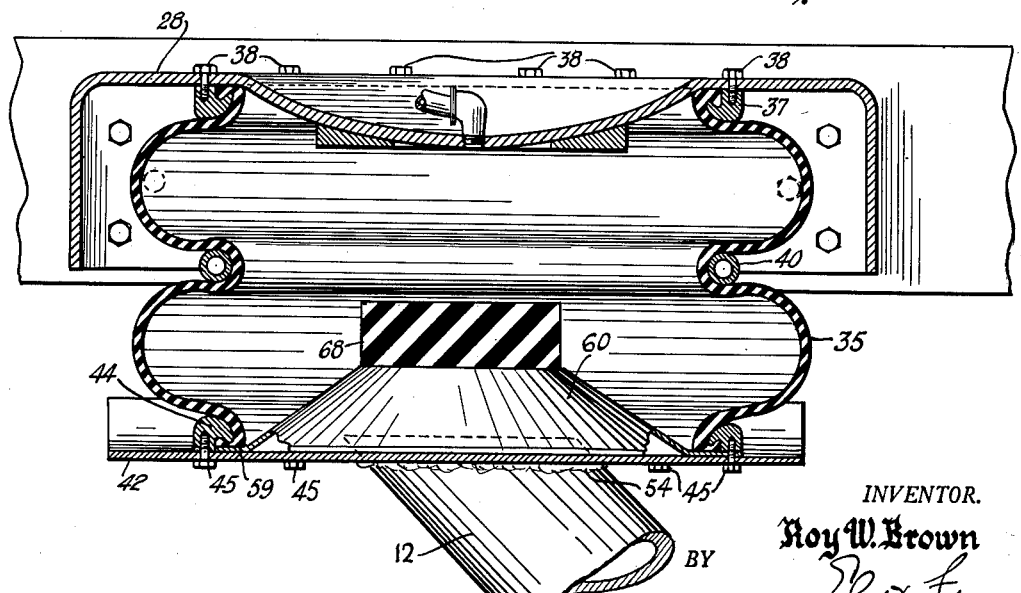
Fig. 4 shows in sectional detail the pneumatic spring suspension assembly shown in elevation in Fig. 1.

The upper end margins of member 51 provide support for a generally conical housing element 60, having a radial projecting base flange portion 59, Fig. 4, disposed below the lower beaded end of bellows 35 and maintained in clamping engagement therewith, against lower end closure plate 42, by pressure applied to ring 44 by clamping bolts 45. The upper or convergent end of cone 60 leads into a portion 61, normal to the cone's axis, and reverses into the cone to define an annular portion 62. Portion 61 of conical housing 60 is welded to member 51, circumferentially thereof, as at 64 to produce, above closure plate 42, an extremely rigid superstructure for the support of an annular resilient bumper element 68, which limits bottoming, as well as providing a passageway forming the sole path of fluid transfer between member 12 and the interior of bellows 35.

Fluid transfer is controlled, during operation of the device, by means of the valve assembly 50 which may be opened from either direction by pressure differential between the interior of the bellows and the interior of the tubular strut member 12. It is understood that any suitable air spring assembly 14 may be employed, and that internal air pressures will be dependent upon the individual suspension. A conduit 63, Fig. 3, with a suitable valve assembly 65, may be provided to permit both inflation and deflation of the assemblies 14.

Figure 5:
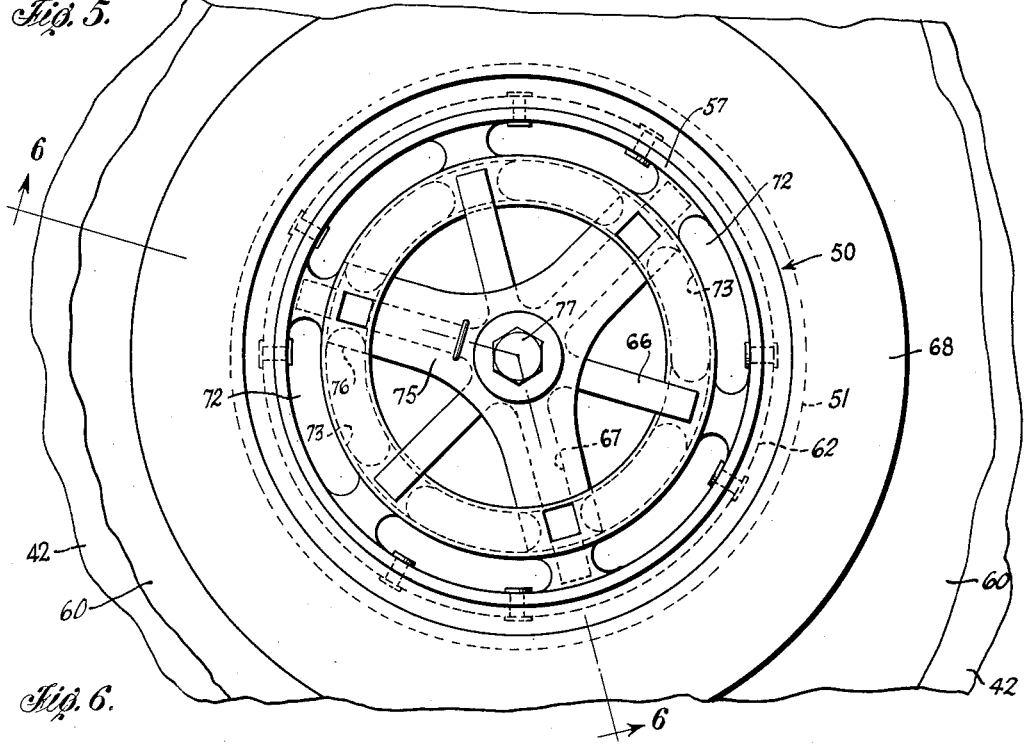
Fig. 5 is a plan view of the valve assembly shown in Fig. 6.

Assembly 50 comprises an annular frame 57, riveted to the annular depending shoulder of element 60, and provided with two concentrically disposed series of ports 72 and 73, as shown in Figs. 5 and 6. Valve elements 70 and 74 are concentrically positioned for seating engagement with the port defining margins of frame 57. Spring assemblies 67 and 66 are positioned to urge valve elements 70 and 74 respectively toward a seating position, and are maintained clamped to opposite sides of frame 57, under spider-like guards 75 and 76, which restrict their movement outwardly, by bolt 77. Assemblies 66 and 67 may be selected, as to stiffness, in view of the particular rate characteristics desired. Applicant's above mentioned patents contain complete information on the effect of controlling pressure differentials existing between the interior of air spring bellows and the interior of reserve tanks, and will not be repeated herein.

Since tubular strut members 12 have their forward ends pivotally engaged to frame 10, with their aft ends secured to bottom plate 42 of air spring assembly 14, the system would lack transverse stability in the absence of supplemental bracing which is obtained by strut assembly 20. This assembly, having arms pivoted at one end at 21 to converge at the universal assembly 22, as heretofore described, adequately constrains the axle assembly 24 against undesirable transverse displacement which would otherwise occur in view of the bellows type connection with air spring assembly 14. It is desirable, however, for the purpose of improving the ride characteristics of the suspension, to allow a small amount of relative movement between the hub portion of assembly 20 and connector 22, hence such movement is permitted.

As best shown in section, Fig. 1, assembly 22 includes a frame member 80, provided with a transverse aperture defining a frusto-conical opening on each side thereof, in which is disposed a gasket element 81 of rubber or rubber-like material. Element 81 defines a pair of cones 82 and 83, mounted on the hub portion 85 of the bracing structure 20 with divergent ends meeting and maintained in clamped assembly by nut 86. This type of bracing structure and mounting are not novel per se but find particular utility in the combination shown, in view of the floatable type mounting presented by the air spring assembly 14. The lower end of frame member 80 is provided with a semi-cylindrical axle housing receiving portion 88 and with a cap portion 89 adapted for clamping engagement therewith by stud screws 90, preferably with a generally cylindrical resilient sleeve 92 interposed therebetween.

While the suspension system illustrated would be operative in the absence of a valve structure between the respective bellows and tubular suspension members, it has been found advantageous to control the flow of air therebetween, and by so doing, advantageously to utilize pressure differentials established during movement of the vehicle to improve not only the ride characteristics thereof by so-called "rate control," a definition of which will be found in applicant's above cited patents, but additionally to obtain greatly improved compensation characteristics between the fore and aft wheels of a tandem suspension system.

Assuming movement of the vehicle over rough terrain, and referring to Fig. 1, upon contact of the forward or solid line wheel, tubular member 12 will be rapidly pivoted against air spring 14 to compress bellows 35, with attendant rapid rise of internal pressure within said bellows. When this pressure has exceeded a predetermined minimum, the urge imparted by spring 67 against annular valve closure member 70 is overcome and member 70 opens to allow the compressed air within bellows 35 to flow through the circumferentially disposed valve parts 72 to pass to the interior of tubular member 12, which serves as an auxiliary reserve tank, thereby to control the "rate" by softening the air spring through reduction of internal pressure following the initial compression of bellows 35. The advantage to be gained thereby is independent of the use of the device in a tandem-type suspension, however additional advantages reside in tandem use.

Assuming the solid line forward wheel of Fig. 1 hits an obstruction of substantial size during rapid forward motion of the vehicle, a substantial and very rapid build-up occurs within bellows 35 which results in almost equally rapid opening of the valve assembly 50 with a resulting pressure build-up internally of tubular element 12. Since this pressure rise is transmitted, through conduit 25, to the interior of a corresponding tubular member 112, which may be identical with member 12 but positioned aft thereof, a condition is created whereby a higher pressure exists within member 112 than in its associated air spring, not shown, but identical with air spring 14. Referring to Fig. 6 and considering tubular member 12, shown therein, to be member 112, identical therewith, the pressure build-up therein may be assumed to be of sufficient magnitude to exert on annular valve closure element 74 sufficient pressure to overcome the urge of spring 66 and permit air passage through the valve structure 50 to the interior of the after positioned air spring bellows. Since the rate of response between the fore and aft air springs is very rapid, a substantial stiffening of the aft air spring may be effected prior to contact by the rear wheel, partly shown dotted, and the obstruction, not shown, which caused the rapid pressure rise within the forward air spring assembly 14. This result is highly desirable, since if the forward wheel is still in a raised condition due to the obstruction, the weight distribution therebetween will be brought into better balance than with a lower internal air spring pressure, and the front wheel will be relieved of the major portion of the load it had originally assumed.

A like result has been attempted by mechanical and, in some instances, by hydraulic mechanisms, but as far as applicant is aware, the response rate or "time constant" of such devices were too slow to effect the desired result within the speed ranges which are common for vehicles employing tandem-type suspension structure. Assuming the obstruction which rapidly moved the forward wheel upwardly with the results outlined above, to be, for example, a large rock which allows the forward wheel to return to its original position prior to contact with the aft wheel, the compression cycle, being momentary, will result in a stiffening of the after air spring followed by closure of valve assembly 50 upon equalization of pressure on both sides thereof. Contact of the aft wheel will result, however, in a rapid rise of internal pressure within that unit and a transmittal, through the system described, of a pressure build-up to the forwardly positioned air spring at an instant when it is desirable that the forward wheels of the tandem assembly absorb a greater load than would normally be absorbed thereby were it not for the transmittal of differentials in pneumatic pressures between the fore and aft air springs. It is therefore seen that substantial compensation is effected to counteract the tendency, in a tandem suspension, of an undue assumption of load, upon meeting an obstruction, first by the forward wheels of the tandem and then by the after wheels.

As above stated, the invention may be practiced in the absence of a check valve assembly, such as assembly 50, for the control of pressure differentials between the air springs and the reservoir capacity presented by the tubular strut members. It is desirable, however, that check valve means be provided to insure optimum benefits from the suspension system. In actual practice the check valve operable on the compression cycle may be responsive to pressure differentials as low as one pound, whereas a pressure differential of eight pounds or more may be built up under extreme conditions, between the interior of the bellows and the interior of the tubular strut.

The structure illustrated in drawings and described above has been presented for the purpose of exemplifying applicant's invention, not by way of limitation, and various other adaptations will be readily recognized as coming within applicant's concept as defined in the following claims.

What is claimed is:

1. In a suspension device, a chassis to be supported, an axle, means for the resilient support of said axle in respect to said chassis, said means comprising a pair of air springs fixed to said chassis to depend therefrom, said air springs being spaced transversely of said chassis, and a pair of elongate tubular members each having a closed end and an open end, the closed ends of said tubular members being pivotally attached to said chassis and the open ends thereof being fixed to the depending ends of said air spring to permit fluid communication between the interior of said air springs and the interior of said tubular members.

2. In combination with a vehicle chassis, a pair of tubular members, each having a closed and an open end, means pivotally attaching the closed ends of said members to the under side of said chassis to permit said tubular members to depend therefrom, a pair of air springs fixed to said chassis to depend therefrom and interposed between said chassis and the open ends of said tubular members, means for fluid communication between the interior of said air springs and the interior of said tubular members, and valve means disposed interiorly of said air springs to restrict fluid flow between the interior of said tubular members and the interior of said air spring.

3. In a device of the character described, the combination with an automotive chassis and a wheel supporting axle, of a radius rod assembly including a pair of strut members having free ends pivotally associated with said chassis and joined ends resiliently connected to said axle at substantially the mid point thereof, a pair of tubular members pivotally engaging said chassis, on an axis coinciding with the pivotal axis of said strut members and closed at the pivoted ends thereof, a pair of air springs fixed to said chassis and positioned laterally of the pivotal attachment of said tubular members, said tubular members being substantially linear for a major portion thereof with the unpivoted end portion thereof arced outwardly and upwardly to extend into said air spring and having fluid sealing engagement with the lower ends of said depending air springs, and valve means inside said tubular members and also inside said air springs for the control of fluid therebetween.

4. The combination with a vehicle frame and an undercarriage including a wheel housing, of means for the partial support of said frame on said wheel housing, said means comprising a pair of pneumatic bellows fixed to said frame to depend therefrom at positions spaced transversely of said frame, a pair of elongated hollow weight-sustaining members disposed longitudinally of said frame and including a forward substantially linear portion sealed at the end and an aft portion defining an arcuate configuration, means for the pivotal attachment of the forward ends of said weight-sustaining members to said frame and means for attaching the aft ends of said members to said bellows, in fluid containing communication thereto.

5. In a suspension device, a vehicle frame to be supported, a pair of axles, means for the resilient support of said frame on said axles, said means comprising plural pairs of air springs fixed to said frame to depend therefrom, said pairs of air springs being spaced transversely of said frame, plural pairs of elongated tubular members each having a closed end and an open end, the closed ends of said tubular members being pivotally attached to said frame and the open ends thereof being fixed to depending portions of said air spring to permit fluid communication between the interiors of said air springs and the interiors of said tubular members, and conduit means connecting the corresponding tubular members of each pair to provide fluid communication between the interiors of said tubular members.

6. In a device of the character described, the combination with a vehicle frame and a pair of wheel supporting axle assemblies, a pair of radius rod assemblies including a pair of strut members having divergent ends pivotally associated with said frame and joined ends resiliently connected to each axle assembly at substantially the middle points thereof, two pairs of tubular members, each pair comprising identical members spaced transversely of the longitudinal axis of said frame and with corresponding forward ends thereof pivotally engaging said frame on an axis co-extensive with the pivotal axis of said strut members, two pairs of air springs fixed to said frame, each said pair comprising two air springs spaced transversely of the longitudinal axis of said frame at positions aft of said co-extensive axes, said tubular members being in fluid-sealing engagement with said air springs for the resilient support of said axle assemblies, valve means associated with said air springs for the control of fluid flow between the interior thereof and the interior of said tubular members, and conduit means connecting corresponding portions of each pair of tubular members of each pair adjacent the pivoted ends thereof to permit fluid communication therebetween.

7. The combination with a vehicle frame and an undercarriage including a pair of spaced wheel housings, of means for the support of said frame on said wheel housings, said means comprising two pairs of pneumatic bellows, the bellows of each pair being spaced transversely of said frame with said pairs spaced longitudinally thereof, two pairs of tubular suspension members, the members of each pair being pivoted at one end to said frame and fixed at the opposite end to an air spring in a manner to permit fluid communication therebetween, and a pair of fluid conduit elements, each element of each said pair being connected between the pivoted ends of said suspension members disposed longitudinally of the tubular suspension elements, to provide fluid control therebetween.

8. In a suspension device, a vehicle frame to be supported, a pair of axle supporting members, means for the resilient support of said frame on said axle supporting members, said means comprising plural pairs of air springs fixed to said frame to depend therefrom, the air springs comprising each of said pairs being spaced transversely of said frame, said pairs spaced longitudinally of said frame, plural pairs of elongate tubular members, each having a closed end and an opposite end fixed to one of said air springs in fluid transfer relationship thereto, means for the pivotal attachment of the closed ends of said tubular members to said frame, and conduit means interconnecting the interiors of the longitudinally aligned air spring and conduit assemblies of each pair for fluid flow therebetween.

References Cited in the file of this patent

UNITED STATES PATENTS

| Number | Name | Date |
|---|---|---|
| 1,342,985 | Cash | June 8, 1920 |
| 1,719,028 | Standlee | July 2, 1929 |
| 1,892,198 | Yevseyeff | Dec. 27, 1932 |
| 2,180,860 | Brown | Nov. 21, 1939 |
| 2,180,876 | Kuhn | Nov. 21, 1939 |
| 2,196,954 | Branstrator | Apr. 9, 1940 |
| 2,208,537 | Brown | July 16, 1940 |
| 2,345,448 | Best | Mar. 28, 1944 |
| 2,360,748 | Whistler et al. | Oct. 17, 1944 |
| 2,393,493 | Brown | Jan. 22, 1946 |
| 2,496,893 | Smith | Feb. 7, 1950 |
| 2,503,378 | Connwell | Apr. 11, 1950 |
| 2,537,637 | Candlin et al. | Jan. 9, 1951 |